(12) United States Patent
Sanio et al.

(10) Patent No.: US 11,615,128 B1
(45) Date of Patent: *Mar. 28, 2023

(54) CONTEXTUAL CONTENT DISTRIBUTION

(71) Applicant: Google LLC, Mountain View, CA (US)

(72) Inventors: Jason Robert Richard Sanio, Sunnyvale, CA (US); Martin B. Freund, Mountain View, CA (US)

(73) Assignee: Google LLC, Mountain View, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 15/793,140

(22) Filed: Oct. 25, 2017

Related U.S. Application Data

(63) Continuation of application No. 15/224,819, filed on Aug. 1, 2016, now Pat. No. 9,811,587, which is a continuation of application No. 14/036,053, filed on Sep. 25, 2013, now Pat. No. 9,424,345.

(51) Int. Cl.
*G06F 16/35* (2019.01)
*G06F 16/182* (2019.01)

(52) U.S. Cl.
CPC ............ *G06F 16/35* (2019.01); *G06F 16/182* (2019.01)

(58) Field of Classification Search
CPC .............................. G06F 16/35; G06F 16/182
See application file for complete search history.

(56) References Cited

U.S. PATENT DOCUMENTS

| | | | |
|---|---|---|---|
| 5,740,549 A | 4/1998 | Reilly et al. | |
| 5,948,061 A | 9/1999 | Merriman | |
| 6,026,368 A | 2/2000 | Brown | |
| 6,269,361 B1 | 7/2001 | Davis et al. | |
| 6,698,020 B1 * | 2/2004 | Zigmond | H04N 5/44513 348/E5.102 |
| 6,795,826 B2 * | 9/2004 | Flinn | G06F 21/6218 |
| 7,136,875 B2 | 11/2006 | Anderson et al. | |
| 7,440,968 B1 * | 10/2008 | Oztekin | G06F 16/951 |
| 7,827,125 B1 | 11/2010 | Rennison | |
| 7,860,449 B1 | 12/2010 | Bowman | |
| 8,126,930 B2 | 2/2012 | Shukla et al. | |
| 8,255,948 B1 | 8/2012 | Black et al. | |
| 8,311,888 B2 | 11/2012 | Ramer | |
| 8,555,167 B2 | 10/2013 | Friedlander et al. | |
| 8,560,550 B2 | 10/2013 | Patterson | |
| 8,645,298 B2 * | 2/2014 | Hennig | G06N 20/00 706/45 |

(Continued)

*Primary Examiner* — Alford W Kindred
*Assistant Examiner* — Tiffany Thuy Bui
(74) *Attorney, Agent, or Firm* — Fish & Richardson P.C.

(57) ABSTRACT

Methods, systems, and apparatus, including computer programs encoded on a computer storage medium, for distributing content based on context are disclosed. In one aspect, a method includes identifying, in a single resource, multiple different content item slots that are available for presentation of multiple different content items. A determination is made that a first content item slot is located in a first portion of the single resource, and that a second content item slot is located in a second different portion of the resource. A first content item is selected for presentation in the first content item slot based on terms that correspond to a first topic of the first portion of the resource. A second content item is selected for presentation in the second content item slot based on terms that correspond to a second topic of the second portion of the resource.

21 Claims, 4 Drawing Sheets

(56) References Cited

U.S. PATENT DOCUMENTS

| | | | |
|---|---|---|---|
| 8,725,732 B1 | 5/2014 | Jeh et al. | |
| 8,891,858 B1* | 11/2014 | Preetham | G06K 9/6256 |
| | | | 382/159 |
| 9,082,128 B2 | 7/2015 | Etchegoyen | |
| 9,367,524 B1* | 6/2016 | Filev | G06F 16/972 |
| 2003/0033347 A1 | 2/2003 | Bolle | |
| 2003/0217052 A1 | 11/2003 | Rubenczyk | |
| 2005/0010605 A1 | 1/2005 | Conrad | |
| 2006/0106792 A1 | 5/2006 | Patterson | |
| 2006/0143175 A1 | 6/2006 | Ukrainczyk | |
| 2007/0078708 A1* | 4/2007 | Yu | G06Q 30/02 |
| | | | 705/14.69 |
| 2007/0185904 A1 | 8/2007 | Matsuzawa | |
| 2008/0010270 A1 | 1/2008 | Gross | |
| 2008/0086466 A1* | 4/2008 | Baker | G06F 16/951 |
| 2008/0270361 A1* | 10/2008 | Meyer | G06F 16/35 |
| 2009/0132373 A1* | 5/2009 | Redlich | G06Q 30/02 |
| | | | 705/14.39 |
| 2009/0204485 A1 | 8/2009 | Wills et al. | |
| 2009/0240729 A1 | 9/2009 | Zwol | |
| 2010/0174607 A1 | 7/2010 | Henkin et al. | |
| 2010/0228582 A1 | 9/2010 | King et al. | |
| 2011/0191338 A1 | 8/2011 | Hylton | |
| 2011/0208722 A1 | 8/2011 | Hannuksela | |
| 2011/0213655 A1 | 9/2011 | Henkin et al. | |
| 2011/0252060 A1* | 10/2011 | Broman | G06F 16/957 |
| | | | 707/771 |
| 2012/0011109 A1 | 1/2012 | Ambwani et al. | |
| 2012/0072281 A1* | 3/2012 | Chang | G06Q 30/0251 |
| | | | 705/14.49 |
| 2012/0116875 A1 | 5/2012 | Wang et al. | |
| 2012/0179550 A1 | 7/2012 | Vieri | |
| 2012/0259702 A1* | 10/2012 | Zhang | G06Q 30/0277 |
| | | | 705/14.54 |
| 2013/0031470 A1* | 1/2013 | Daly, Jr. | G06F 16/9535 |
| | | | 715/243 |
| 2013/0124339 A1 | 5/2013 | Park | |
| 2014/0032321 A1 | 1/2014 | Krafcik et al. | |
| 2014/0205103 A1 | 7/2014 | Lu | |
| 2014/0214835 A1* | 7/2014 | Oehrle | G06F 16/35 |
| | | | 707/737 |

* cited by examiner

CONTEXTUAL CONTENT DISTRIBUTION

CROSS-REFERENCE TO RELATED APPLICATION

This application is a continuation of U.S. application Ser. No. 15/224,819, filed Aug. 1, 2016, which is a continuation of U.S. application Ser. No. 14/036,053, filed Sep. 25, 2013, the contents of which are hereby incorporated in their entirety.

BACKGROUND

This specification relates to data processing and content distribution.

The Internet facilitates the exchange of information and transactions between users across the globe. This exchange of information enables content sponsors to provide sponsored content to a variety of users. A content sponsor can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content sponsor is deemed eligible to be provided for presentation.

SUMMARY

In general, one innovative aspect of the subject matter described in this specification can be embodied in methods that include the actions of identifying, in a single resource, multiple different content item slots that are available for presentation of multiple different content items; identifying, based on resource content of the single resource, two or more groups of terms that are each related to different topics; determining that a first content item slot is located in a first portion of the single resource and that the second content item slot is located in a second different portion of the single resource; determining that the first portion of the single resource is related to a different topic than the second portion of the single resource based on the resource content and the at least two groups of terms; selecting a first content item for the first content item slot based on at least one of the groups of terms that corresponds to a first topic of the first portion of the single resource; and selecting a second different content item for the second different content item slot based on at least one of the groups of terms that corresponds to a second topic of the second portion of the single resource. Other embodiments of this aspect include corresponding systems, apparatus, and computer programs, configured to perform the actions of the methods, encoded on computer storage devices.

These and other embodiments can each optionally include one or more of the following features. Methods can include the actions of determining, based on the two or more groups of terms, an overall topic for the resource. Selecting a first content item for the first content item slot can include identifying one or more eligible content items eligible for presentation based on the first topic; identifying one or more eligible content items eligible for presentation based on the overall topic; and selecting, based on selection scores for the eligible content items, one of the eligible content items for presentation in the first content item slot.

Methods can include the actions of assigning, to each of the groups of terms, a group value that is based on a similarity between the group of terms and a portion of the resource content that is in the first portion of the single resource and a proximity of the portion of the resource content to the first content item slot. Selecting a first content item can include selecting the first content item based, at least in part, on the group of terms having a highest group value.

Selecting a first content item for the first content item slot can include identifying one of the two or more groups of terms that correspond to resource content that is within a threshold distance of the first content item slot; and selecting the first content item based on the identified group of terms.

Determining that a first content item slot is located in a first portion of the single resource and that the second content item slot is located in a second different portion of the single resource can include determining, based on contents of the resource, that a resource delineator is located between the first content item slot and the second content item slot.

Determining that a resource delineator is located between the first content item slot and the second content item slot can include determining that one of a page break indicator or a text heading is located between the first content item slot and the second content item slot.

Determining that a first content item slot is located in a first portion of the single resource and that the second content item slot is located in a second different portion of the single resource can include determining, based on contents of the resource, that a first image located within a threshold distance of the first content item slot corresponds to a different topic than a second image located within a threshold distance of the second content item slot.

Particular embodiments of the subject matter described in this specification can be implemented so as to realize none, one, or more of the following advantages. User satisfaction with distributed content can be facilitated by identifying sub-portions of the content that are related to different topics, and selecting content items for presentation based on the identified topics and proximity of content item slots to content related to the different topics. Content items that are each related to different topics can be selected for presentation based on a determination that a single resource has sub-portions that are respectively related to the different topics, thereby facilitating organization of content items with related content in a multi-topic resource. The relevance of content items presented next to particular sub-portions of content can be improved by identifying the different topics corresponding to different sub-portions of content and evaluating the relevance of content items related to each of the different topics.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
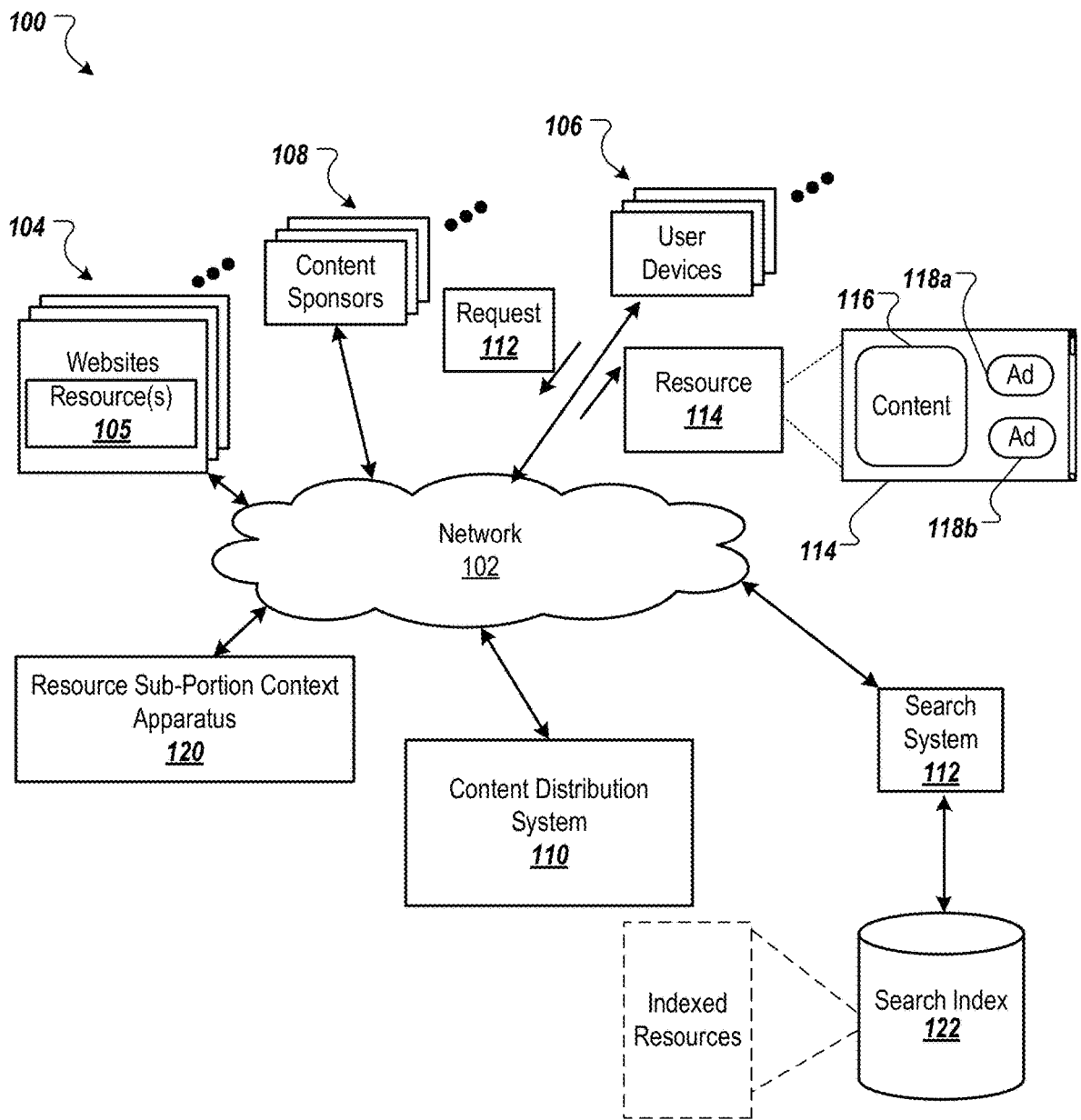
FIG. 1 is a block diagram of an example environment in which content is distributed to user devices.

Content items are selected for presentation with a resource that has multiple different sections of content. The content items that are selected for presentation can be content items that are related to either a topic corresponding to one of the sections of content, or an overall topic to which the resource is determined to be related. For example, assume that a webpage is generally related to travel, and includes Caribbean travel information and Alaska travel information. Further assume that the Alaska travel information is located in one portion of the resource (e.g., a top portion of a webpage), while the Caribbean travel information is located in a different portion of the resource (e.g., a bottom portion of the webpage). In this example, content items that are eligible for presentation with the resource can include content items that are related to Caribbean travel, Alaskan travel, and travel in general. As discussed in more detail below, the content item selection can be based, at least in part, on bids that are associated with the various content items, locations of content item slots (e.g., advertising slots) in the resource, and/or the relatedness of the content items to the various topics to which the resource is related.

In some implementations, a resource can be determined to have different sections of content using groups of terms (also referred to as term groups) that are identified in the resource content. For example, terms from the resource content can be grouped together based on similarity, and the topic to which each group of terms relates can be determined. A measure of similarity between each group of terms and each of the different portions of the resource content can be determined, and as discussed in more detail below, the measures of similarity can be used to identify different sections of the resource content that are related to different topics. These different topics are then used to select content items for presentation with the resource.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of webpages formatted in hypertext markup language (HTML) that can contain text, images, multimedia content, and programming elements, such as scripts. Each website 104 is maintained by (or for) a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a webpage from a social network, or another resource 105. The data representing the requested resource 114 can include data that cause presentation of resource content 116 at the user device 106. The data representing the requested resource 114 can also include data specifying one or more content item slots 118a, 118b. A content item slot is a portion of the resource (e.g., a portion of a webpage) or a portion of a user display (e.g., a presentation location of another window or in a slot of a webpage) in which one or more content items, such as advertisements, can be presented. A content item slot 118a or 118b can also be referred to as an advertisement slot, but any type of content (e.g., content items other than advertisements) can be presented in the content item slot 118a or 118b.

To facilitate searching of resources, the environment 100 can include a search system 112 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 112 over the network 102. In response, the search system 112 accesses the search index 122 to identify resources that are relevant to the search query. The search system 112 identifies the resources in the form of search results and returns the search results to the user device in search results page. A search result is data generated by the search system 112 that identifies a resource that is responsive to a particular search query, and includes a link to the resource. An example search result can include a webpage title, a snippet of text or a portion of an image extracted from the webpage, and the URL of the webpage. Like other resources, search results pages can include one or more content item slots 118*a*, 118*b* in which content items, such as advertisements, can be presented.

When a resource 105 is requested by a user device 106, execution of code associated with a content item slot 118*a* or 118*b* in the resource initiates a request for a content item to populate the slot. The request can include characteristics of the slots that are defined for the requested resource 114. For example, a reference (e.g., URL) to the requested resource 114 for which the content item slots 118*a* and 118*b* are defined, sizes of the content item slots 118*a* and 118*b*, and/or media types that are eligible for presentation in the content item slots 118*a* and 118*b* can be provided to the content distribution system 110. Similarly, keywords associated with a requested resource ("resource keywords") or entities that are referenced by the resource can also be provided to the content distribution system 110 to facilitate identification of content items that are relevant to the requested resource 114. The requests can also include other information, such as information that the user has provided, geographic information indicating a state or region from which the request was submitted, or other information that provides context for the environment in which the content item will be displayed (e.g., a type of device at which the content item will be displayed, such as a mobile device or tablet device). As described in detail with reference to FIG. 2, resource keywords can be identified based on the resource content 116. For example, terms and/or phrases can be extracted from the content resource 116 and grouped based on topics to which the terms and/or phrases are relevant. The terms and/or phrases as well as terms referencing the related topics can be used as resource keywords.

The content items that are provided in response to a request (or another content item request) are selected based, in part, on distribution parameters associated with the content items. Distribution parameters are a set of criteria upon which distribution of content items are conditioned. In some implementations, the distribution criteria for a particular content item can include distribution keywords that must be matched (e.g., by resource keywords, which are also referred to as resource terms) in order for the content item to be eligible for presentation. The distribution criteria can also specify a bid and/or budget for distributing the particular content item. As described in more detail below, bids can be used, in part, to select a set of content items for presentation with a resource and/or to determine in which content item slot 118*a* or 118*b* the content item(s) will be presented.

Some resources may be generally related to an overall topic, such as travel, while different portions of the resource may present information related to particular subtopics. For example, a resource related to travel may present information related to Alaskan travel in one portion of the resource, while presenting information related to Caribbean travel in a different portion of the resource. In some implementations, the environment 100 includes a resource sub-portion context apparatus 120 that identifies different sub-portions of a single resource that are each related to different topics to facilitate selection of content items for presentation in each of the different sub-portions of the resource. For example, as described in more detail below, the resource sub-portion context apparatus 120 can identify the different topics to which each of the different sub-portions of the resource are related by comparing groups of keywords to the content of the different sub-portions. In turn, content items related to the various different topics can be selected for presentation in the different sub-portions that have been identified as related to the topics. Thus, the content items that are presented in each of the different resource sub-portions can be related to the information that is presented in that sub-portion.

Figure 2:
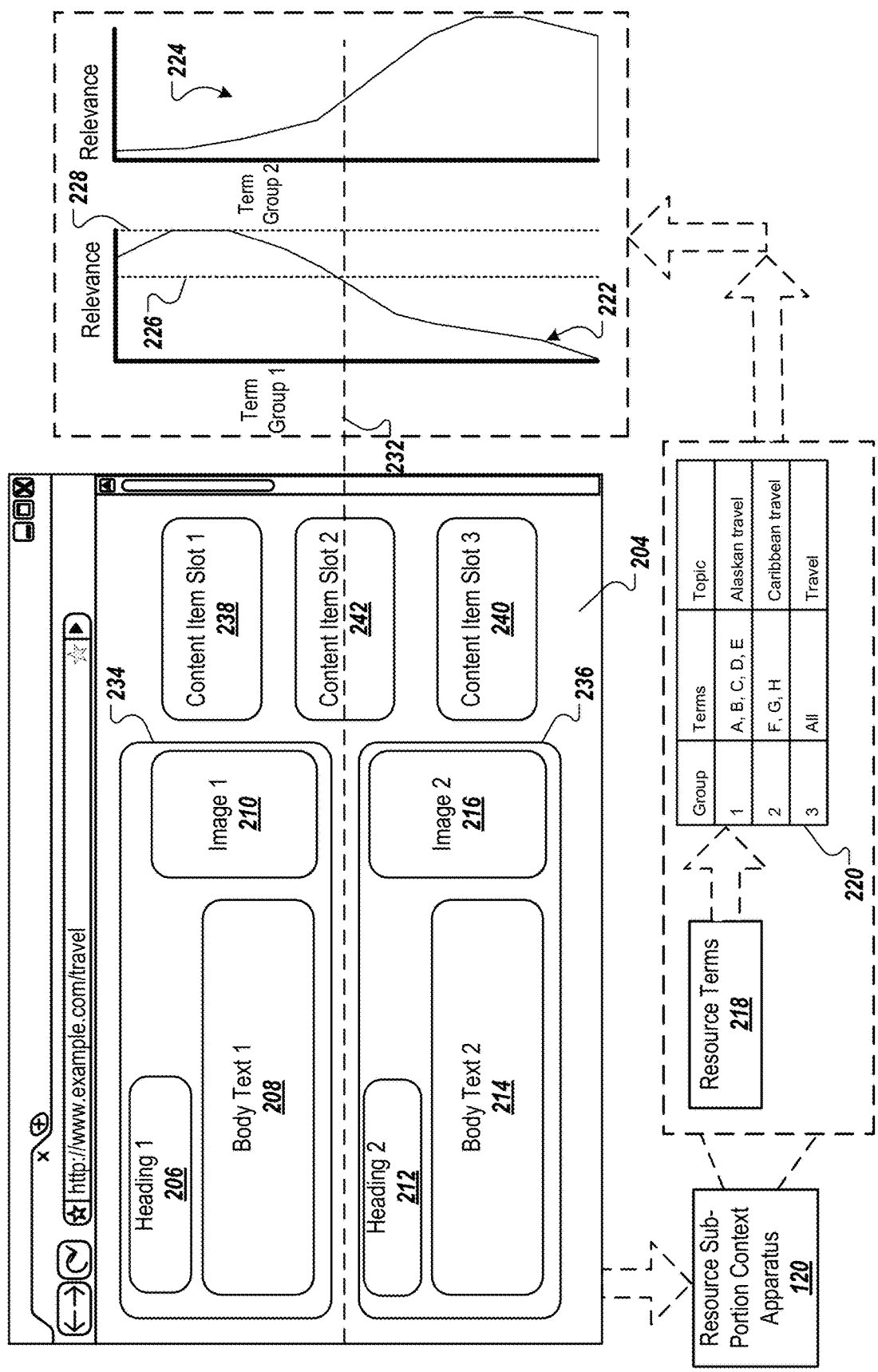
FIG. 2 is a block diagram illustrating an example data flow for distributing content items to different sub-portions of a resource that are related to different topics.

FIG. 2 is a block diagram illustrating an example data flow 200 for distributing content items to different sub-portions of a resource that are related to different topics. The data flow 200 begins with identifying a resource 204. The resource 204 can be, for example, a webpage related to one or more topics. For example, the webpage can be generally related to travel, for example, by providing travel related information. The webpage can also be related to other topics, such as Alaskan Travel and Caribbean Travel.

As illustrated by FIG. 2, the resource 204 includes "Heading 1" 206 (referred to as "heading 206"), "Body Text 1" 208 (referred to as "body text 208"), and "image 1" 210 (referred to as "image 210"). The heading 206 can be a heading describing the body text 208 and/or the image 210. For example, assume that the body text 208 provides information regarding travel to Alaska, and that the image 210 is a picture of Alaskan landscape. In this example, the heading 206 could be text such as "Alaskan travel information." The body text 208 can be, for example, information related to one or more particular topics. For example, as described above the body text 208 can provide information regarding travel to Alaska. The image 210 can be, for example, an image related to the body text 208 and or the heading 206. For example, as described above the image 210 can be an image of Alaskan landscape, or some other image related to Alaskan travel.

The resource 204 also includes "heading two" 212 (referred to as "heading 212"), "body text 2" 214 (referred to as "body text 214"), and "image two" 216 (referred to as "image 216"). The body text 214 can provide information about one or more topics. For example, the body text 214 may provide information related to Caribbean travel. In this example, the heading 212, which can describe the body text 214 and/or the image 216, can include text related to Caribbean travel. For example, the heading 212 could be "Caribbean Cruises." The image 216 can be, for example, an image related to the body text 214 and/or the heading 212. For example, the image 216 may be an image of a Caribbean beach.

In some implementations, the overall topic of the resource 204 can be determined by extracting (or identifying) resource terms 218 that are included in the content of the resource 204, and identifying a topic to which the resource terms 218 are related. For purposes of illustration, assume that the heading 206 and body text 208 include various resource terms 218 related to Alaskan travel, such as "cruise," "flight," "adventure," "vacation," "Chugach Mountains," "Glacier Bay," "Alaska," and "Matanuska Glacier." Also assume that the heading 212 and body text 214 include various resource terms 218 related to Caribbean travel, such as "Caribbean," "travel," "Aruba," "snorkeling," "beach," "flight," and "accommodations." The resource sub-portion context apparatus 120 can use these resource terms 218 and any other resource terms 218 included in the resource 204 to determine a topic descriptive of the content of the resource 204. For example, the resource sub-portion context apparatus 120 can utilize a clustering algorithm and/or a hierarchical classification technique to identify the overall topic to which the resource 204 is related. For purposes of this example, assume that the resource sub-portion context apparatus 120 determines that the overall topic for the resource 204 is "travel."

In addition to determining the overall topic to which the resource is related, the resource sub-portion context apparatus 120 can also utilize the resource terms 218 and/or term clusters identified by the resource sub-portion context apparatus 120 to identify one or more sub-portions of the resource 204 and subtopics to which the sub-portions are respectively related. For example, assume that the resource sub-portion context apparatus 120 identified two distinct groups (or clusters) of resource terms 218 that are each related to a different subtopic. In particular, as illustrated by the table 220, assume that the resource sub-portion context apparatus 120 grouped terms A, B, C, D, and E into a term group called Term Group 1, and determined that the terms included in Term Group 1 are related to Alaskan travel. Also assume that the resource sub-portion context apparatus 120 grouped terms F, G, and H into a second term group called Term Group 2, and determined that the terms included in Term Group 2 are related to Caribbean travel.

In some implementations, the resource sub-portion context apparatus 120, or another data processing apparatus, can determine that the resource 204 includes sub-portions based on a relevance of the term groups to various portions of the resource 204. For example, assume that the resource sub-portion context apparatus 120 determines that Term Group 1 is more relevant to one portion of the resource 204, while Term Group 2 is more relevant to another portion of the resource 204. In this example, the portion of the resource that is more relevant to Term Group 1 can constitute a sub-portion of the resource that is related to the subtopic Alaskan travel, while the portion of the resource that is more relevant to Term Group 2 can constitute a second sub-portion of the resource that is related to the subtopic Caribbean travel.

The relevance of a particular term group to a particular portion of a resource can be based, at least in part, on a comparison of the term group to content included in the particular portion of the resource. For example, the relevance of a particular term group to a particular portion of the resource can generally be based on a number terms in the particular portion of the resource that match the resource terms in the particular term group. For example, assume that the heading 206 and body text 208 include more instances of the terms that are included in Term Group 1 than the heading 212 and body text 214. In this example, the relevance of Term Group 1 to the portion of the resource 204 in which the heading 206 and body text 208 are located may be considered higher than the relevance of Term Group 1 to the portion of the resource 204 in which the heading 212 and body text 214 are located. The relevance of Term Group 2 to various portions of the resource 204 can be determined in a similar manner.

In some implementations, the relevance of a particular term group to a particular portion of the resource is expressed as a group value that can be based solely on the number of terms that are included in the particular portion as described above and/or other factors. For example, the group value can also be based, at least in part, on characteristics of the text that matches a term in the term group. The characteristics of the text can include, for example, whether the text is header text or body text, with header text being associated with a higher group value than body text. The characteristics can also include a font size, with larger font text generally being associated with a higher group value. The characteristics can also include a font color, with different font colors being associated with different group values. Other text characteristics can be associated with different group values, and used to determine the group value for a term group relative to a particular portion of content. The following discussion refers to the relevance of term groups to various portions of a resource. The relevance can be expressed in terms of a group value or some other measure of relevance.

FIG. 2 includes an example graph 222 that provides an example illustration of the relevance of Term Group 1 relative to various portions of the resource 204. As illustrated by the graph 222, Term Group 1 has been determined to be generally more relevant to a top half of the resource 204 in which the heading 206 and body text 208 are located. An example graph 224 provides an example illustration of the relevance of Term Group 2 to various portions of the resource 204. As illustrated by the graph 224, Term Group 2 has been determined to be generally more relevant to a bottom half of the resource 204 in which the heading 212 and body text 214 are located. The example graphs 222 and 224 are visual representations of a manner in which the relevance of various term groups to various portions of a resource can be determined. For example, the comparison of a term group to content of the resource 204 can be determined on a line by line basis or a section by section basis.

In some implementations, a resource can be considered to have a sub-portion that is related to a particular subtopic when the relevance of a term group varies by at least a threshold amount from one portion of the resource to another portion of the resource. For example, assume that the dotted lines 226 and 228 represent a threshold relevance difference is required in order for a resource to be considered to have a sub-portion that is related to a particular subtopic. In this example, the relevance of Term Group 1 changes by more than the threshold amount, such that the resource 204 can be considered to have a sub-portion that is related to the subtopic corresponding to Term Group 1 (e.g., Alaskan travel). In this example, the identification of the sub-portion of the resource 204 can be performed independent of the measures of relevance for Term Group 2.

The resource sub-portion identification described above can be performed for multiple different term groups. For example, as illustrated by the graph 224, Term Group 2 is considered more relevant to the bottom portion of the resource 204 (i.e., the portion of the resource 204 that is below the dashed line 232). Assume for purposes of this example that the relevance of Term Group 2 varies more than the threshold amount, such that the bottom portion of the resource 200 for can be considered a sub-portion that is related to the subtopic corresponding to Term Group 2 (e.g., Caribbean travel).

In some implementations, multiple different term groups can be required to vary by at least a threshold amount in order for a resource to be considered to have sub-portions that are related to distinct subtopics. For example, as illustrated by the graphs 222 and 224, the relevance of term group 1 and term group 2 both vary by at least the threshold amount, and are respectively considered to be more relevant to different portions of the resource 204. For example, as described above, term group 1 is considered to be more relevant to the top portion of the resource 204 (i.e., the portion of the resource 204 that is above the line 232), while term group 2 is considered to be more relevant to the bottom portion of the resource 204, and the relevance of each term group varies by at least the threshold amount. Thus, in this example, the resource 204 can be considered to have two different sub-portions (e.g., disjoint portions of the resource) that are respectively related to different subtopics.

In some implementations, the identification of a sub-portion of the resource 204 requires that there be at least a threshold difference in relevance between one term group and at least one other term group (or all other term groups). Continuing with the example above, Term Group 1 has been identified as highly relevant to the top portion of the resource 204, while Term Group 2 has been identified being less relevant to the top portion of the resource 204. In this example, the top portion of the resource 204 can be considered to be a sub-portion of the resource 204 when the relevance of Term Group 1 to the top portion of the resource 204 is at least a threshold amount higher than the relevance of Term Group 2 to the top portion of the resource 204.

In some implementations, the identification of a sub-portion of a resource can be based on other factors beyond just the relevance of various term groups to various portions of the resource. For example, the document object module (DOM) and/or cascade style sheet (CSS) for the resource can be evaluated to identify various resource characteristics that can facilitate the identification of resource sub-portions. Some of the resource characteristics that can facilitate the identification of a resource sub-portion include page breaks, bulleting, numbering, lines, headers, and other characteristics that are related to the delineation of a resource. Each of these characteristics can be evaluated in the context of the term group relevance discussed above to identify delineations that correspond to resource sub-portions.

For example, with reference to FIG. 2, the heading 212 separates body text 208 from body text 214. In this example, the location of the heading 214 suggests that the top portion of the resource 204 may be related to a different subtopic (or topic) than the bottom portion of the resource 204. In some implementations, the identification of a resource delineator in the CSS or other resource information can be used in conjunction with the group values to identify a location at which the resource 204 is delineated into different sub-portions (e.g., the location of the line 232). For example, the location of the resource delineator can be considered the delineation between two different sub-portions of the resource when it is determined that the relevance of one term group is decreasing near the location of the resource delineator while the relevance of a second term group is increasing near the location of the resource delineator.

Additionally, or alternatively, the identification of a resource delineator can reduce the threshold relevance differences that are required for identifying sub-portions of the resource 204. In the examples provided above, the identification of a sub-portion of the resource was conditioned on one or more threshold variations (or differences) in measures of relevance. In some implementations, the identification of a resource delineator in the resource 203 can lower the threshold variation (or difference) that is required for identifying a sub-portion below that required if a resource delineator is not identified.

Other resource characteristics can be used to facilitate the identification of a resource sub-portion. In some implementations, the identification of images in a resource and/or characteristics of the identified images can be used to facilitate the identification of resource sub-portions. For example, in FIG. 2, the resource 204 includes images 210 and 216. In this example, the image 210 is more proximate to the body text 208 than the image 216, and is therefore more likely to be relevant to the body text 208 than the image 216. Similarly, the image 216 is more proximate to the body text 214 than the image 210, and therefore more likely to be relevant to the body text 214. Additionally, the heading 212 is located after the image 210, which also indicates that the body text 214 may be more related to the image 216 than the image 210. In this example, the identification of images 210 and 216, as well as their relative locations increases the likelihood that the resource 204 includes two sub-portions that are related to two different subtopics.

In addition to the existence and locations of images in a resource, the content of the images and/or labels (e.g., descriptive text) associated with the images can be used to determine whether a resource includes sub-portions. For example, image analysis can be used to identify one or more objects in each of the images 210 and 216. Using information regarding the identified images and/or labels associated with the images, a determination can be made whether the images are related to different topics. If the images are determined to be related to different topics, such a determination would suggest that the resource 204 includes sub-portions, which could be reflected in the relevance scores for the term groups, by adjusting the threshold variation (or difference) in relevance scores, or otherwise adjusting the likelihood that the resource would be considered to include sub-portions related to different subtopics.

Assume for purposes of example that the resource 204 has been determined to include two sub-portions. As illustrated by FIG. 2, the resource 204 includes a set of content 234 that is located in a top sub-portion of the resource 204 and is related to Alaskan travel. The resource 204 also includes another set of content 236 that is located in a bottom portion of the resource 204 and is related to Caribbean travel. In this example, each set of content 234 and 236 is related to travel, but each relates to a different particular travel subtopic. In this example, some users that visit the example resource 204 may be particularly interested in the information regarding Alaskan travel (e.g., the set of content 234 that is located in the top portion of the resource 204), while other users that visit the example resource 204 may be more interested in the information regarding Caribbean travel (e.g., the set of content 236 that is located in the bottom sub-portion of the resource 204). Since the users that visit the resource 204 may have differing interests within the general topic of travel, content items that are presented to the various users may be more effective if the content items are related to the interests of the particular users. However, the interests of each particular user may not be known prior to presentation of the resource 204 and/or selection of content items to be presented with the resource 204.

Although the subtopic interests of the particular users may not be known prior to presentation of the resource 204 and/or selection of the content items to be presented with the resource, content items can be selected based, at least in part, on the proximity of the content item slot to one or more various resource sub-portions. For example, since the content item slot 238 is located in the top sub-portion of the resource, content items that are relevant to the subtopic of the top sub-portion (e.g., Alaskan travel) may be more likely to be selected for placement in the content item slot 1 238. Similarly, since the content item slot 3 240 is located in the bottom sub-portion of the resource 204, content items that are relevant to the subtopic of the bottom portion (e.g., Caribbean travel) may be more likely to be selected for placement in the content item slot 204. Since the content item slot 2 242 is partially located in each of the top sub-portion and the bottom sub-portion, the content items that are relevant to the top sub-portion may be just as likely to be selected as content items that are relevant to the subtopic of the bottom portion.

In some implementations, the proximity of a content item slot to a particular sub-portion of a resource can be expressed as a weight, which is referred to as a relevance weight, and used to adjust the likelihood that content items related to the topic corresponding to the particular sub-portion of the resource are selected for presentation. For example, a content item slot (e.g., content item slot 1 238) that is located within a particular sub-portion of a resource (e.g., the top sub-portion of the resource 204 may be assigned a weight of 1.0 (or some other value) for being in the particular sub-portion. In this example, content item slots (e.g., content item slot 2 242) that are located only partially in the particular sub-portion can be assigned a lower weight (e.g., 0.7), and content item slots (e.g., content item slot 3 240) that are located in other sub-portions (e.g., the bottom sub-portion of the resource 204) can be assigned even lower weights (e.g., 0.5) relative to the topic corresponding to the particular sub-portion. With respect to the overall topic of the resource, each content item slot can be assigned a same weight (e.g., 0.60) indicating that the overall topic of the resource is equally relevant to each of the content item slots.

These weights can be combined, at least in part, with bids for content items related to the various topics to identify those content items that will be selected for presentation in each of the content items slots. For example, assume that three content items are available for presentation in content item slot 1 238, and that at least some of the characteristics of the available content items are represented by Table 1.

TABLE 1

| Content Item | Bid (eCPM) | Distribution Term | Relevance Weight | Selection Score = bid*relevance weight |
|---|---|---|---|---|
| Content Item 1 | $1.00 | Travel | 0.6 | 0.6 |
| Content Item 2 | $0.75 | Alaskan | 1.0 | 0.75 |
| Content Item 3 | $0.50 | Caribbean | 0.5 | 0.25 |

In this example, content item 2 has a lower bid that content item 1, but content item 2 has a higher relevance weight for content item slot 1, which is located in the sub-portion of resource 204 in which information related to Alaskan travel is presented. Therefore, the relevance weight applied to the bid associated with content item 2 is higher than the weight that is applied to the bid associated with content item 1, which is eligible for presentation for having the distribution term "travel" that matches the overall topic of the resource.

In this example, content item 2 can be selected for presentation in content item slot 1 because it has the highest selection score among the available content items. Note that for purposes of this example, the relevance weights for content item 1 and content item 2 are based on the proximity of content item slot 1 to the respective sub-portions of the resource 204 that are related to Alaskan Travel and Caribbean travel. In some implementations, the relevance weights can also, or alternatively, be based on other factors (e.g., content item size, content item quality, or expected click through rate) and/or combined with weights representing other factors to arrive at a selection score that can be used to select content items for presentation in the various content items slots.

In some implementations, the selection of content items for presentation in a particular content item slot can be based on the outcome of multiple different content item selection procedures. For example, to select a content item for presentation in content item slot 1, a first content item selection process can be performed using Term Group 1 (or the topic associated with Term Group 1), a second content item selection process can be performed using Term Group 2 (or the topic associated with Term Group 2), and another content item selection process can be performed based on Term Group 3 (or the overall topic of the resource). The selection scores resulting from each of the selection processes can be used to select the content item and/or weighted using the relevance weights discussed above (and/or other weights) and then used to identify the content item that is selected for presentation in content item slot 1.

Figure 3:
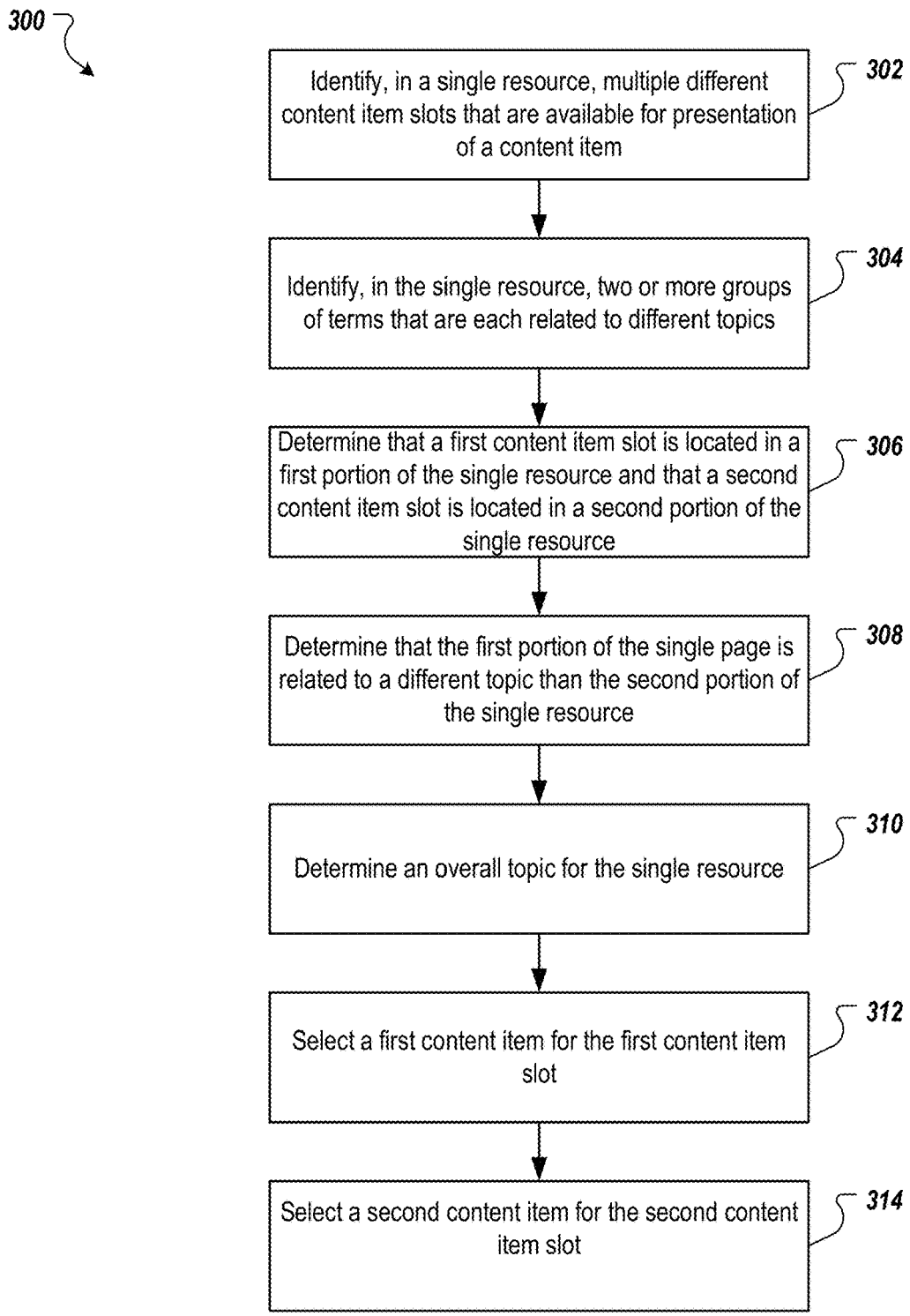
FIG. 3 is a flow chart of an example process for selecting content items for presentation in different sub-portions of a resource.

FIG. 3 is a flow chart of an example process 300 for selecting content items for presentation in different sub-portions of a resource. Operations of the process 300 can be performed, for example, by one or more data processing apparatus, such as the resource sub-portion context apparatus 120 and/or content distribution system 110. In some implementations, operations of the process 300 can be implemented as instructions stored on a non-transitory computer readable medium. Execution of the instructions by one or more data processing apparatus causes the one or more data processing apparatus to perform operations of the process 300.

Multiple different content item slots that are available for presentation of multiple different content items are identified in a single resource (302). In some implementations, the different content items slots can be identified, for example, in response to receipt of a content item request corresponding to a plurality of content item slots in the resource. For example, when a resource is rendered, code included in the resource can initiate a request for content items to be presented in one or more content item slots that are included in the resource. Based on information included in the request, a number of content items slots that are included in the resource and the locations of the content item slots can be identified. Additionally, or alternatively, the location of each content items slot can be determined by examining the code of the resource (e.g., crawling the resource).

Two or more groups of terms that are each related to different topics are identified based on resource content of the single resource (304). In some implementations, the groups of terms can be identified by evaluating the content of the resource. For example, as discussed above with respect to FIG. 2, terms can be identified in and/or extracted from the text of the resource and grouped together based on similarity. In some implementations, a topic to which each term group is related can be identified based on the topics to which the terms in each group are related. In a particular example, the topic to which the group of terms is related can be a topic that is associated with the most terms in the group. In some implementations, a group of terms can be deemed related to more than one topic, for example, if at least a threshold number of the terms in the group are related to each of two or more different topics, the group can be considered related to each of the two or more different topics.

A first content item slot is determined to be in a first portion of the single resource, and a second content item slot is determined to be in a second different portion of the single resource (306). In some implementations, the determination that the first content item slot and second content item slot are located in different portions of the resource can be based, at least in part, on the identification of a resource delineator between the content items slots.

For example, as discussed above with respect to FIG. 2, if a page break, a text header, or other indicators of resource delineation (e.g., bullets, numbering, different images, or two images related to different topics) are located between the two content item slots, the content item slots can be considered to be located in different sub-portions of the resource. The use of two images as an indicator of a resource delineation can be conditioned on one of the images being within a threshold distance (e.g., number of pixels) of one content items slot, and the other image being within a threshold distance (e.g., number of pixels) of the other content item slot, which can be an indication that there is a topic change between the two content item slots.

The first portion of the single resource is determined to be related to a different topic than the second portion of the resource (308). In some implementations, the different topics to which the two different portions of the resource are related is determined based on the resource content and the groups of terms that were identified for the resource. For example, as discussed above with respect to FIG. 2, each of the various term groups can be compared to different portions of the resource content to determine a measure of similarity and/or relevance between the various term groups and the various portions of the resource.

As illustrated by FIG. 2, the relevance of different term groups can vary throughout a resource, and the variance in the relevance throughout the resource can be an indication that the resource includes two or more sub-portions that are related to different topics. For example, as illustrated by FIG. 2, the relevance of Term Group 1 to the top portion of the resource 204 is higher than the relevance of Term Group 2 to the top portion of the resource. In this example, the relevance of Term Group 2 to the bottom portion of the resource 204 is higher than the relevance of Term Group 1 to the bottom portion of the resource 204. Thus, in this example, the top portion of the resource can be determined to be related to the topic corresponding to Term Group 1, while the bottom portion of the resource can be determined to be related to the topic corresponding to Term Group 2.

Optionally, an overall topic is determined for the single resource (310). In some implementations, the overall topic is determined based on the term groups that were identified based on the resource content. For example, as discussed above with respect to FIG. 2, the term groups that are identified based on the resource content can each be related to different subtopics of a particular topic, which for purposes of this document are considered to be different topics. In this example, the overall topic of the resource can be one or more topics to which the subtopics each relate. For example, if one term group is related to Alaskan travel and another term group is related to Caribbean travel, one overall topic of the resource may be "travel," since both of the term groups are related to the topic travel.

In some implementations, the overall topic for the resource can be a topic to which the combination of terms from each of the term groups is most relevant. For example, the terms from each term group can be combined to create an overall term group, and topic to which the overall term group is related can be determined based on the relevance of the overall term group to one or more topics. In this example, the topic to which the overall term group is most relevant (or has at least a threshold relevance score) can be selected as the overall topic for the resource.

A first content item is selected for the first content item slot based on at least one group of terms that corresponds to the first topic (312). In some implementations, the first content item is selected based on a combination of a bid associated with the content item and a measure of relevance of the content item to the portion of the resource in which the content item slot is located. For example, as discussed above with respect to FIG. 2, a selection score can be computed for different content items, and the content item that is presented in the content item slot can be selected based on the selection scores.

In some implementations, the content item selection is performed on a per content item slot basis, such that a separate selection process can be performed for each content item slot. For example, each content item having a distribution term that is deemed to match a term (or topic) from one of the term groups can be identified as a content item that is eligible for presentation in a content item slot of the resource. In this example, the bids associated with each content item can be scaled based on the proximity of the content item slot to a portion of the resource that is considered most related to the matched term group.

For example, as illustrated by Table 1 above, content item 1 is eligible for presentation based on the distribution term "travel" matching the overall resource topic of travel, and is assigned an overall topic relevance weight of 0.6, which is combined with the bid of $1.00 to arrive at a selection score of 0.6. Content item 2, which has a distribution keyword Alaskan that matches a term group that was identified as most related to the top portion of the resource 204 in which content item slot 1 238 is located is assigned a relevance weight of 1.0 since the content item slot 1 is located in the top portion of the resource 204. Content item 3 has a distribution keyword of Caribbean that was determined to match term group 2, and is assigned a relevance weight of 0.5 because content item slot 1 238 is located in the top portion of the resource 204, while the bottom portion of the resource is considered to be most relevant to term group 2. In this example, content item 2 will be selected for presentation because it has the highest selection score among the three eligible content items.

In some implementations, multiple content item selection processes similar to that described above can be performed for a single content item slot. For example, a separate selection process can be performed on a per term group basis, and then the winning content items from each selection process can compete to determine which content item will be presented in response to a particular content item request. The term groups that are used to select content items for presentation can be limited to those term groups corresponding to resource content that is within a threshold distance (e.g., number of pixels) of the content item slot for which content items are being selected. For example, when a content item is being selected for a particular content item slot, the term groups that must be matched by distribution keywords of the content items can be limited to those term groups that have at least a threshold relevance (or are most relevant) to resource content that is within the same portion of the resource as the content items slot or is in an adjacent portion of the resource.

In some implementations, a group value can be used to represent the relevance of a term group to a particular content item slot. With respect to a particular content item slot the group value can be based on the relevance of the term group to a particular portion of resource content and other factors, such as the proximity of the particular portion of resource content and the content item slot. For example, as discussed above with respect to FIG. 2, the proximity of the content item slot to the particular portion of the resource can be expressed as a weight, and the weight may generally increase as proximity to the content item slot increases. This weight can be combined with a measure of similarity between the term group and the resource content presented in the particular portion of the resource to arrive at the group value.

In some implementations, the content item presented in the particular content item slot will be selected based on the term group having the highest group value. For example, terms in the term group having the highest group value can be used to identify eligible content items having distribution terms that match a term in the group, and the selection scores for the eligible content items can be used to select the content item that will be provided for presentation in the first content item slot.

A second content item is selected for the second content item slot based on at one group of terms that corresponds to the second topic (314). In some implementations, the selection of the second content item can be performed in a manner similar to that discussed above with respect to the first content item.

Figure 4:
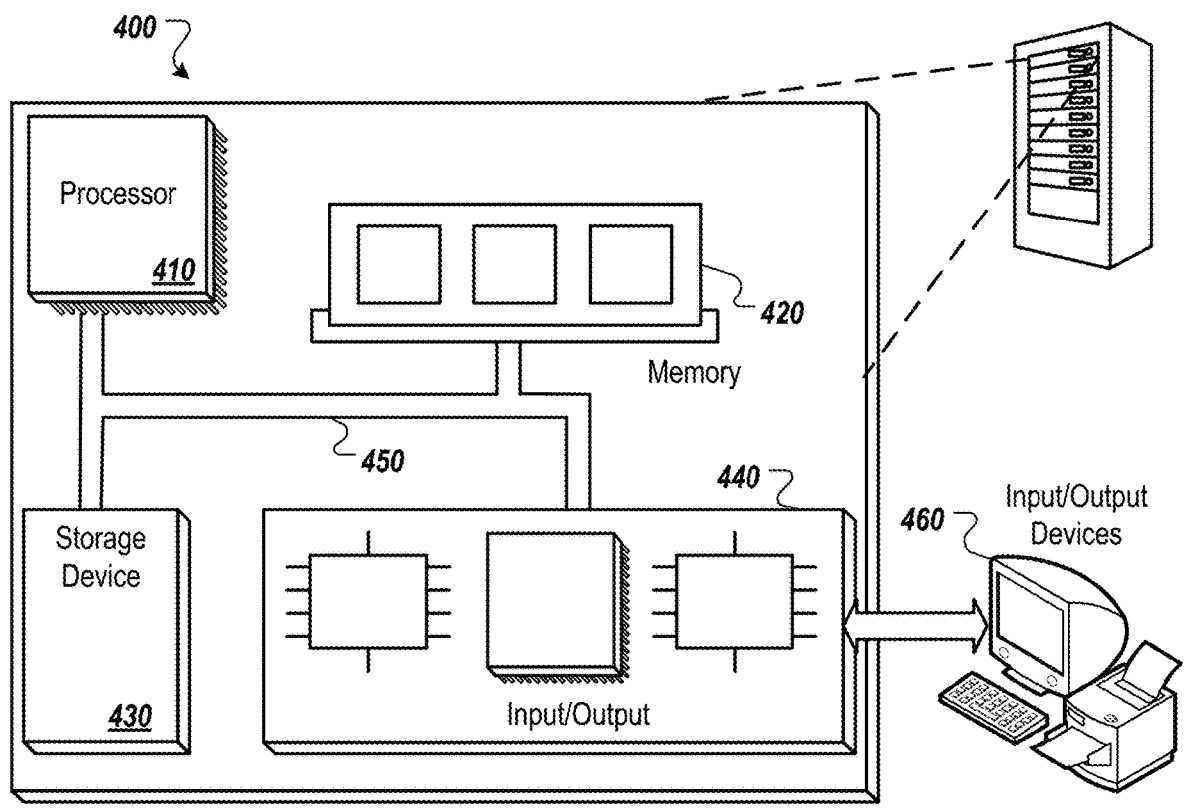
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   identifying, by one or more data processing apparatus, multiple different locations within a single web page that are available for presentation of a content item, wherein a first location of the multiple different locations is located at a first sub-portion of the single web page, a second location of the multiple different locations is located at a second sub-portion of the single web page, and the first sub-portion and second sub-portion are separated by a resource content delineator that is identifiable in a structure of the single web page;
   identifying, by the one or more data processing apparatus, a content item for presentation in the single web page;
   determining, by the one or more data processing apparatus and based on a first proximity indicating a presentation distance of the first location to the first sub-portion that is smaller than a second proximity indicating a presentation distance of the first location to the second sub-portion, that distribution parameters of the content item are more relevant to first content presented in the first sub-portion of the single web page than second content presented in the second sub-portion of the single web page; and in response to determining that the distribution parameters of the content item are more relevant to the first content presented in the first sub-portion, providing data that cause presentation of the content item in the first location of the single web page.

2. The method of claim 1, further comprising:

determining a first relevance of a first group of terms from the first content presented in the first sub-portion of the single web page to the distribution parameters of the content item; and determining a second relevance of a second group of terms from the second content presented in the second sub-portion of the single web page to the distribution parameters of the content item.

3. The method of claim 1, wherein the presentation distance is a visual distance or display distance.

4. The method of claim 3, further comprising:

generating a selection score for a content item based on a bid specified for a particular distribution parameter that matches a topic of the first sub-portion and a first relevance weight of the first location to the first sub-portion; and selecting the content item for distribution based on the selection score.

5. The method of claim 1, wherein identifying multiple different locations within the single web page comprises identifying, within a structure of the single web page a page break or a text header, wherein the first location and the second location are delineated by the identified page break or text header.

6. The method of claim 1, wherein identifying multiple different locations within the single web page comprises:

identifying two different images in the single web page;

determining that the two different images, including each of a first image and a second image, are related to two different topics; and determining that the first location is within a threshold distance of the first image and the second image is within a threshold distance of the second image.

7. The method of claim 6, further comprising:

determining an overall topic for the single web page based on aggregate content from various different sub-portions of the single web page, wherein the overall topic of the single web page differs from a first topic of the first sub-portion and a second topic of the second sub-portion;

wherein identifying a content item for presentation in the single web page comprises:

selecting a first content item for presentation in the first location of the single web page based on distribution criteria of the first content item being matched by a first topic of content presented in the first sub-portion;

selecting a second content item for presentation in the second location of the single web page based on distribution criteria of the second content item being matched by a second topic of the second sub-portion; and selecting a third content item for presentation at a third location of the single web page based on distribution criteria of the third content item being matched by the overall topic of the single web page.

8. A system, comprising:

a data store storing content items for presentation in content item slots; and one or more data processing apparatus including one or more processors that interacts with the data store and executes instructions that cause the one or more data processing apparatus to perform operations comprising:

identifying multiple different locations within a single web page that are available for presentation of a content item, wherein a first location of the multiple different locations is located at a first sub-portion of the single web page, a second location of the multiple different locations is located at a second sub-portion of the single web page, and the first sub-portion and second sub-portion are separated by a resource content delineator that is identifiable in a structure of the single web page;

identifying a content item for presentation in the single web page;

determining, based on a first proximity indicating a presentation distance of the first location to the first sub-portion that is smaller than a second proximity indicating a presentation distance of the first location to the second sub-portion, that distribution parameters of the content item are more relevant to first content presented in the first sub-portion of the single web page than second content presented in the second sub-portion of the single web page; and in response to determining that the distribution parameters of the content item are more relevant to the first content presented in the first sub-portion, providing data that cause presentation of the content item in the first location of the single web page.

9. The system of claim 8, wherein the instructions cause the one or more data processing apparatus to perform operations further comprising:

determining a first relevance of a first group of terms from the first content presented in the first sub-portion of the single web page to the distribution parameters of the content item; and determining a second relevance of a second group of terms from the second content presented in the second sub-portion of the single web page to the distribution parameters of the content item.

10. The system of claim 8, wherein the instructions cause the one or more data processing apparatus to perform operations further comprising expressing the proximity of the first location to each of the first sub-portion and the second sub-portion as a relevance weight, wherein a relevance weight of the first location to the first sub-portion is higher than a second relevance weight of the first location to the second sub-portion based on the first location being more visually proximate to the first sub-portion than the second-sub-portion.

11. The system of claim 10, wherein the instructions cause the one or more data processing apparatus to perform operations further comprising:

generating a selection score for a content item based on a bid specified for a particular distribution parameter that matches a topic of the first sub-portion and the first relevance weight of the first location to the first sub-portion; and selecting the content item for distribution based on the selection score.

12. The system of claim 8, wherein identifying multiple different locations within the single web page comprises identifying, within a structure of the single web page a page break or a text header, wherein the first location and the second location are delineated by the identified page break or text header.

13. The system of claim 8, wherein identifying multiple different locations within the single web page comprises:
identifying two different images in the single web page;
determining that the two different images, including each of a first image and a second image, are related to two different topics; and
determining that the first location is within a threshold distance of the first image and the second image is within a threshold distance of the second image.

14. The system of claim 13, wherein the instructions cause the one or more data processing apparatus to perform operations further comprising:
determining an overall topic for the single web page based on aggregate content from various different sub-portions of the single web page, wherein the overall topic of the single web page differs from a first topic of the first sub-portion and a second topic of the second sub-portion;
wherein identifying a content item for presentation in the single web page comprises:
selecting a first content item for presentation in the first location of the single web page based on distribution criteria of the first content item being matched by a first topic of content presented in the first sub-portion;
selecting a second content item for presentation in the second location of the single web page based on distribution criteria of the second content item being matched by a second topic of the second sub-portion; and
selecting a third content item for presentation at a third location of the single web page based on distribution criteria of the third content item being matched by the overall topic of the single web page.

15. A non-transitory computer storage medium encoded with a computer program comprising instructions that when executed by one or more data processing apparatus, including one or more processors, cause the one or more data processing apparatus to perform operations comprising:
identifying multiple different locations within a single web page that are available for presentation of a content item, wherein a first location of the multiple different locations is located at a first sub-portion of the single web page, a second location of the multiple different locations is located at a second sub-portion of the single web page, and the first sub-portion and second sub-portion are separated by a resource content delineator that is identifiable in a structure of the single web page;
identifying a content item for presentation in the single web page;
determining, based on a first proximity indicating a presentation distance of the first location to the first sub-portion that is smaller than a second proximity indicating a presentation distance of the first location to the second sub-portion, that distribution parameters of the content item are more relevant to first content presented in the first sub-portion of the single web page than second content presented in the second sub-portion of the single web page; and
in response to determining that the distribution parameters of the content item are more relevant to the first content presented in the first sub-portion, providing data that cause presentation of the content item in the first location of the single web page.

16. The non-transitory computer storage medium of claim 15, wherein the instructions cause the one or more data processing apparatus to perform operations further comprising:
determining a first relevance of a first group of terms from the first content presented in the first sub-portion of the single web page to the distribution parameters of the content item; and
determining a second relevance of a second group of terms from the second content presented in the second sub-portion of the single web page to the distribution parameters of the content item.

17. The non-transitory computer storage medium of claim 15, wherein the instructions cause the one or more data processing apparatus to perform operations further comprising expressing the proximity of the first location to each of the first sub-portion and the second sub-portion as a relevance weight, wherein a relevance weight of the first location to the first sub-portion is higher than a second relevance weight of the first location to the second sub-portion based on the first location being more visually proximate to the first sub-portion than the second-sub-portion.

18. The non-transitory computer storage medium of claim 17, wherein the instructions cause the one or more data processing apparatus to perform operations further comprising:
generating a selection score for a content item based on a bid specified for a particular distribution parameter that matches a topic of the first sub-portion and the first relevance weight of the first location to the first sub-portion; and
selecting the content item for distribution based on the selection score.

19. The non-transitory computer storage medium of claim 15, wherein identifying multiple different locations within the single web page comprises identifying, within a structure of the single web page a page break or a text header, wherein the first location and the second location are delineated by the identified page break or text header.

20. The non-transitory computer storage medium of claim 15, wherein identifying multiple different locations within the single web page comprises:
identifying two different images in the single web page;
determining that the two different images, including each of a first image and a second image, are related to two different topics; and
determining that the first location is within a threshold distance of the first image and the second image is within a threshold distance of the second image.

21. The non-transitory computer storage medium of claim 20, wherein the instructions cause the one or more data processing apparatus to perform operations further comprising:
determining an overall topic for the single web page based on aggregate content from various different sub-portions of the single web page, wherein the overall topic of the single web page differs from a first topic of the first sub-portion and a second topic of the second sub-portion;
wherein identifying a content item for presentation in the single web page comprises:
selecting a first content item for presentation in the first location of the single web page based on distribution criteria of the first content item being matched by a first topic of content presented in the first sub-portion;

selecting a second content item for presentation in the second location of the single web page based on distribution criteria of the second content item being matched by a second topic of the second sub-portion; and selecting a third content item for presentation at a third location of the single web page based on distribution criteria of the third content item being matched by the overall topic of the single web page.

\* \* \* \* \*